(12) United States Patent
Tarkkala

(10) Patent No.: US 7,640,593 B2
(45) Date of Patent: Dec. 29, 2009

(54) USER-CONTROLLED MANAGEMENT OF TPM IDENTITIES

(75) Inventor: Lauri Tarkkala, Espoo (FI)

(73) Assignee: Nokia Corporation, Espoo (FI)

(*) Notice: Subject to any disclaimer, the term of this patent is extended or adjusted under 35 U.S.C. 154(b) by 878 days.

(21) Appl. No.: 11/112,725

(22) Filed: Apr. 21, 2005

(65) Prior Publication Data

US 2006/0242428 A1 Oct. 26, 2006

(51) Int. Cl.
*G06F 7/04* (2006.01)
*G06F 17/30* (2006.01)
*G06F 12/14* (2006.01)
(52) U.S. Cl. .............................. 726/26; 726/2; 713/189
(58) Field of Classification Search .................. 726/26; 713/189
See application file for complete search history.

(56) References Cited

U.S. PATENT DOCUMENTS

| 6,678,833 | B1* | 1/2004 | Grawrock | 713/401 |
|---|---|---|---|---|
| 7,382,880 | B2* | 6/2008 | Angelo et al. | 380/259 |
| 7,484,091 | B2* | 1/2009 | Bade et al. | 713/164 |
| 2003/0023872 | A1 | 1/2003 | Chen et al. | |
| 2004/0098589 | A1* | 5/2004 | Appenzeller et al. | 713/170 |
| 2005/0058294 | A1* | 3/2005 | Chen et al. | 380/277 |
| 2005/0081065 | A1* | 4/2005 | Brickell et al. | 713/202 |

FOREIGN PATENT DOCUMENTS

EP 1282023 A1 4/2005

OTHER PUBLICATIONS

Bajikar, Sundeep Trusted Platform Module (TPM) based on Security on Notebook PCs- White Paper, 2002, Mobile Platforms Group Intel Corp., pp. 1-20.*
Strasser, Mario A Software-based TPM Emulator for Linux, 2004, Swiss Federal Institue of Technology, pp. 1-56.*
Pashalidis, et al., Single Sign-On Using Trusted Platforms, 2003, Springer-Verlag, pp. 54-68.*
Marchensini, et al. Experimenting with TCPA/TCG Hardware Or: How I Learned to Stop Worrying and Love the Bear, 2003, Dartmouth Computer Science Technical Report, pp. 1-20.*
Trusted Computing Group, Part 1 Design Principles, Specification version 1.2, Rev. 62, Published Oct. 2, 2003, [retrieved on Apr. 7, 2006] from the Internet <URL:https://www.trustedcomputinggroup.org/specs/TPM/tpmwg-mainrev62_Part1_Design_Principles.pdf>, Capter 27, cited in the application.

* cited by examiner

*Primary Examiner*—Kambiz Zand
*Assistant Examiner*—William S Powers

(57) ABSTRACT

The invention is in the field of security and trustworthy computing. The invention relates to a method for managing identities in a device comprising a trusted platform module. In the method an identity related command is used for performing identity related action; a delegation agent, a storage key for secure storage, and a delegation for the identity related command are created. Further, said delegation is sealed using the created storage key to a trustworthy system state; and the sealed delegation is delivered to the delegation agent.

19 Claims, 6 Drawing Sheets

USER-CONTROLLED MANAGEMENT OF TPM IDENTITIES

FIELD OF THE INVENTION

This invention is in the field of security and trustworthy computing. The invention relates to a method for managing identities in a device comprising a trusted platform module. The invention also relates to a device, a system, a module, and a program product.

BACKGROUND OF THE INVENTION

A TPM is a "Trusted Platform Module" that can be used to implement a wide variety of security functions in a computational platform. The specifications currently created by the Trusted Computing Group (TCG) however limit the ability to create new identities with which the TPM may communicate to the owners of a "TPM owner authorization secret". The owners of this secret however may also shut down the TPM permanently. If critical system services depend on the TPM this would be disastrous and may cause a risk for a device to be eligible for warranty, if a piece of un-trusted software could do this.

The TCG defined TPM 1.2 which defines the concepts of attestation identities and secure storage areas. At the root of the hierarchy is a "secure storage root". This is an area of secure storage that can only be accessed by parties that have access to the storage root key authorization secret. Secure storage is implemented using asymmetric storage keys that are wrapped by a parent storage key. Each storage key (except the root) has exactly one parent storage key and a single store key can have a multitude of child storage keys. A storage key defines a single secure storage area. The areas of secure storage therefore constitute a tree-like structure, with the "secure storage root" as the root of the tree. Each area of secure storage can have its own "authorization secret" that is required to be able to access the area of secure storage. Loading a secure storage key into a TPM also requires knowledge of the parent storage key authorization secret (except for the root storage key). Additionally the secure storage area can be restricted to be available to a certain defined state of the platform.

Attestation identities however are all linked directly to the secure storage root and additionally creation of these identities requires approval from the owner of the TPM.

Authorization

All objects inside a TPM can have an authorization secret associated with them. Knowledge of this authorization secret is then required for using this object. Additionally knowledge of a parent object's authorization secret is often required for creating an object.

The TCG TPM 1.2 defines three authorization protocols that can be used: OI-AP, OS-AP, and DSAP.

OI-AP (Object Independent Authorization Protocol) is based on the TPM_OIAP command. This command creates a handle inside a TPM and associates a nonce with it. At this point no secrets are exchanged. Use of this handle to authorize commands requires that each command is separately authorized using the authorization key of the object the command is manipulating. This means that the handle cannot be forwarded to another party for later use.

OS-AP (Object Specific Authorization Protocol) is based on the TPM_OSAP command. This command creates a handle bound to a single object inside a TPM and creates a shared secret from it. The shared secret is computed as HMAC_SHA1{object authz secret}(server nonce||client nonce). The handle can then be passed to another party who then will not need the actual object authorization key to use authorization. The generated session secret can once be used to encrypt an input parameter. This encryption is generally performed using an XOR with SHA1(shared secret||some nonce). Using this encryption voids the OS-AP session. Additionally the shared secret can be (with a similar method) be used to encrypt the nonces passed back and forth in the protocol.

DSAP (Delegation Specific Authorization Protocol) is based on the TPM_DSAP command. This command creates a handle bound to a single delegation authorizing. This protocol also creates a shared secret specific to the session similar to the OS-AP protocol.

Delegation

Delegation is performed using the following commands:

Delegate Manage (TPM_Delegate_Manage);

Key Creation (TPM_Delegate_CreateKeyDelegation);

Creation of Owner (TPM_Delegate_CreateOwnerDelegation);

Owner loading (TPM_Delegate_LoadOwnerDelegation);

Table reading (TPM_Delegate_ReadTable);

Verification updating (TPM_Delegate_UpdateVerification); and

Delegation verification (TPM_Delegate_VerifyDelegation).

The TPM Owner is an entity with a single "super user" privilege to control TPM operation. Thus if any aspect of a TPM requires management, the TPM Owner must perform that task himself or reveal his privilege information to another entity. This other entity thereby obtains the privilege to operate all TPM controls, not just those intended by the Owner. Therefore the Owner often must have greater trust in the other entity than is strictly necessary to perform an arbitrary task.

This delegation model addresses this issue by allowing delegation of individual TPM Owner privileges (the right to use individual Owner authorized TPM commands) to individual entities, which may be trusted processes.

Consumer user does not need to enter or remember a TPM Owner password. This is an ease of use and security issue. Not remembering the password may lead to bad security practices, increased tech support calls and lost data.

Role based administration and separation of duty. It should be possible to delegate just enough Owner privileges to perform some administration task or carry out some duty, without delegating all Owner privileges.

TPM should support multiple trusted processes. When a platform has the ability to load and execute multiple trusted processes then the TPM should be able to participate in the protection of secrets and proper management of the processes and their secrets. In fact, the TPM most likely is the root of storage for these values. The TPM should enable the proper management, protection and distribution of values held for the various trusted processes that reside on the same platform.

Trusted processes may require restrictions. A fundamental security tenet is the principle of least privilege, that is, to limit process functionality to only the functions necessary to accomplish the task. This delegation model provides a building block that allows a system designer to create single purpose processes and then ensure that the process only has access to the functions that it requires to complete the task.

There is no desire to remove the current TPM Owner and the protocols that authorize and manage the TPM Owner. The capabilities are a delegation of TPM Owner responsibilities. The delegation allows the TPM Owner to delegate some or all of the actions that a TPM Owner can perform. The TPM Owner has complete control as to when and if the capability delegation is in use.

Revoking a delegation, does not affect other delegations— The TPM Owner may, at any time, determine that a delegation is no longer appropriate. The TPM Owner needs to be able to ensure the revocation of all delegations in the same family. The TPM Owner also wants to ensure that revocation done in one family does not affect any other family of delegations.

External delegations need authorization and assurance of revocation. When a delegation is held external to the TPM, the TPM must ensure authorization of the delegation when loading the delegation. Upon revocation of a family or other family changes the TPM must ensure that prior valid delegations are not successfully loaded.

There is, however, one nuance in this delegation mechanism. The creation of owner command delegations cannot be delegated in a secure manner. This is because delegations of owner commands are done using the creation of owner command (TPM_Delegate_CreateOwnerDelegation) and the actual delegated command is passed as an input parameter. Delegating a right to use the creation of owner command (TPM_Delegate_CreateOwnerDelegation) is essentially equivalent to giving that party the TPM owner secret. This is not desirable, as if one possesses the TPM owner secret one may be able to permanently disable the TPM in question. This is especially disastrous in the case of embedded systems that are under warranty.

These mechanisms allow essentially delegating access to the make identity command (TPM_MakeIdentity) and the activate identity command (TPM_ActivateIdentity) to other parties. However, there is no secure way to dynamically at runtime let arbitrary parties create TPM identities without resorting to use of the TPM owner secret.

The TCG TPM version 1.2 allows sealing access to data to a certain "trust-state" of the platform. The trust-state is measured using a stack of so-called "Platform Configuration Registers" that contain a hash (or hash-chain) of software loaded into the software stack of the host system. In a PC, for example, the lowest register of the stack could be a measurement of the BIOS, the second lowest register could be a measurement of the boot-loader of the OS and so forth.

If some object has been sealed to a certain trust-state then that data is available only when the system is in that trust-state. This is performed e.g. by encrypting an object in such a manner that only the TPM can decrypt the object and verify its integrity. Inside this object is then stored decryption and verification keys and the required trust-state for the actual sealed data.

Sealing and unsealing an object requires access to the authorization data of the parent storage key object.

SUMMARY OF THE INVENTION

This invention presents a solution to the problem of providing the end-user and remote-parties to create Trusted Platform Module (TPM) identities without compromising the availability of critical system services.

According to an aspect of the present invention there is provided a method comprising
using an identity related command for performing identity related action;
creating a delegation agent;
creating a storage key for secure storage;
creating a delegation for the identity related command;
sealing said delegation using the created storage key to a trustworthy system state; and
delivering the sealed delegation to the delegation agent.

According to a second aspect of the present invention there is provided a trusted platform module comprising
a storage;
a first component for using an identity related command for performing identity related action;
a second component for creating a delegation agent;
a third component for creating a storage key for secure storage;
a fourth component for creating a delegation for the identity related command;
a fifth component for sealing said delegation using the created storage key to a trustworthy system state; and
a sixth component for delivering the sealed delegation to the delegation agent.

According to a third aspect of the present invention there is provided an electronic device comprising a trusted platform module comprising
a storage;
a first component for using an identity related command for performing identity related action;
a second component for creating a delegation agent;
a third component for creating a storage key for secure storage;
a fourth component for creating a delegation for the identity related command;
a fifth component for sealing said delegation using the created storage key to a trustworthy system state; and
a sixth component for delivering the sealed delegation to the delegation agent.

According to a fourth aspect of the present invention there is provided a system comprising
an electronic device;
a communication network; and
a remote device;
wherein the electronic device comprises a trusted platform module comprising
    a storage;
    a first component for using an identity related command for performing identity related action;
    a second component for creating a delegation agent;
    a third component for creating a storage key for secure storage;
    a fourth component for creating a delegation for the identity related command;
    a fifth component for sealing said delegation using the created storage key to a trustworthy system state; and
    a sixth component for delivering the sealed delegation to the delegation agent.

According to a fifth aspect of the present invention there is provided a computer program product carrying program code for managing identities in a device comprising a trusted platform module, the program code comprising instructions for using an identity related command for performing identity related action;
creating a delegation agent;
creating a storage key for secure storage;
creating a delegation for the identity related command;
sealing said delegation using the created storage key to a trustworthy system state; and
delivering the sealed delegation to the delegation agent.

When the sealed delegation object is given to the delegation agent, the delegation agent is able to respond to requests from other parties to create TPM identities and it is able to implement them as long as the system is in a trustworthy state.

On of the advantages of this solution is that it allows creation of new TPM identities (e.g. for network operators) without putting the device at risk in such a manner that it may be eligible for warranty.

DESCRIPTION OF THE DRAWINGS

In the following the invention will be described in more detail with reference to the attached figures, in which.

DETAILED DESCRIPTION OF THE INVENTION

Figure 2:
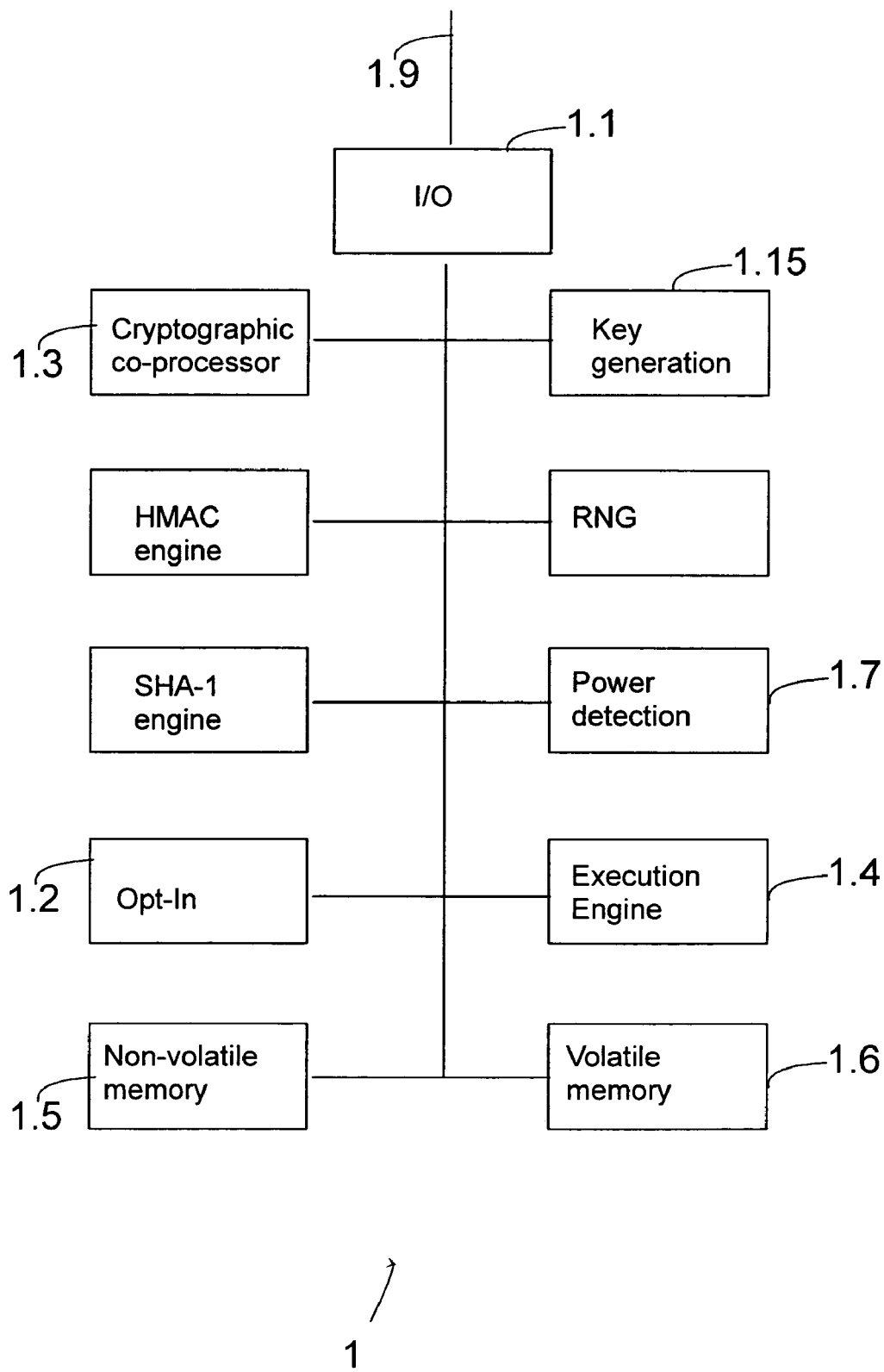
FIG. 2 depicts the structure of a TPM as a simplified block diagram.

In FIG. 2 there is depicted the structure of a TPM 1 as a simplified block diagram. The TPM comprises an I/O component 1.1 for communicating with other parts of a device 2 in which the TPM is implemented. The communication is performed e.g. via the communication bus 1.9. The I/O component 1.1 manages information flow over the communications bus 1.9. It performs protocol encoding/decoding suitable for communication over external and internal buses. It routes messages to appropriate components. The I/O component 1.1 enforces access policies associated with the Opt-In component 1.2 as well as other TPM functions requiring access control.

There is also a cryptographic co-processor 1.3, which implements cryptographic operations within the TPM 1. The TPM 1 can employ conventional cryptographic operations in conventional ways. Those operations include the following:

Asymmetric key generation (RSA);

Asymmetric encryption/decryption (RSA);

Hashing (SHA-1); and

Random number generation (RNG).

The TPM 1 uses these capabilities to perform generation of random data, generation of asymmetric keys, signing and confidentiality of stored data. The TPM 1 may use symmetric encryption for internal TPM use but does not expose any symmetric algorithm functions to general users of the TPM 1. The TPM may implement additional asymmetric algorithms. TPM devices that implement different algorithms may have different algorithms to perform the signing and wrapping. The TPM 1 may implement other asymmetric algorithms such as DSA or elliptic curve.

These algorithms may be in use for wrapping, signatures and other operations.

The Key Generation component 1.15 of the TPM creates RSA key pairs and symmetric keys.

The Opt-In component 1.2 provides mechanisms and protections to allow the TPM 1 to be turned on/off, enabled/disabled, activated/deactivated. The Opt-In component 1.2 maintains the state of persistent and volatile flags and enforces the semantics associated with these flags. The setting of flags requires either authorization by the TPM Owner or the assertion of physical presence at the platform. The platform's manufacturer determines the techniques used to represent physical-presence. The guiding principle is that no remote entity should be able to change TPM status without either knowledge of the TPM Owner or the Operator is physically present at the platform. Physical presence may be asserted during a period when platform operation is constrained such as power-up.

The execution engine 1.4 runs program code to execute the TPM commands received from the I/O component 1.1. The execution engine is an important component in ensuring that operations are properly segregated and shield locations are protected.

The non-volatile memory component 1.5 is used to store persistent identity and state associated with the TPM 1. The non-volatile memory area has set items and is also available for allocation and use by entities authorized by the TPM 1.

There is also a volatile memory 1.6 for storing e.g. temporal data and volatile flags, such as PhysicalPresenceV.

The power detection component 1.7 is used to detect power insertion and/or power failures.

In the following, some details of the operation of the TPM 1 are described. Through the course of TPM operation, it may enter several operational modes that include power-up, self-test, administrative modes and full operation. The TPM keeps the information relative to the TPM operational state in a combination of persistent and volatile flags TPM_Init transitions the TPM from a power-off state to one where the TPM begins an initialization process. TPM_Init could be the result of power being applied to the platform or a hard reset. TPM_Init sets an internal flag to indicate that the TPM is undergoing initialization. The TPM must complete initialization before it is operational. The completion of initialization requires the receipt of the TPM_Startup command.

The TPM is not fully operational until all of the self-tests are complete. Successful completion of the self-tests allows the TPM to enter fully operational mode.

Fully operational does not imply that all functions of the TPM are available. The TPM needs to have a TPM Owner and be enabled for all functions to be available.

The TPM transitions out of the operational mode by having power removed from the system. Prior to the exiting operational mode the TPM prepares for the transition by executing the TPM_SaveState command.

Startup transitions the TPM from the initialization state to an operational state. The transition includes information from the platform to inform the TPM of the platform operating state. TPM_Startup has three options: Clear, State and Deactivated.

The Clear option informs the TPM 1 that the platform is starting in a "cleared" state or most likely a complete reboot. The TPM is to set itself to the default values and operational state specified by the TPM Owner.

The State option informs the TPM that the platform is requesting the TPM to recover a saved state and continue operation from the saved state. The platform previously made the TPM_SaveState request to the TPM such that the TPM prepares values to be recovered later.

The Deactivated state informs the TPM that it should not allow further operations and should fail all subsequent command requests. The Deactivated state can only be reset by performing another TPM_Init.

After the TPM completes both TPM_Startup and self-tests, the TPM is ready for operation.

There are three discrete states, enabled or disabled, active or inactive and owned or unowned. These three states when combined form eight operational modes.

S1 is the fully operational state where all TPM 1 functions are available. S8 represents a mode where all TPM 1 features (except those to change the state) are off.

Given the eight modes of operation, the TPM 1 can be flexible in accommodating a wide range of usage scenarios. The default delivery state for a TPM 1 should be S8 (disabled, inactive and unowned). In S8, the only mechanism available to move the TPM 1 to S1 is having physical access to the platform.

A disabled TPM 1 is not able to execute commands that use the resources of a TPM 1. While some commands are available (SHA-1 for example) the TPM 1 is not able to load keys and perform TPM_Seal and other such operations. These restrictions are the same as for an inactive TPM 1. The difference between inactive and disabled is that a disabled TPM 1 is unable to execute the TPM_TakeOwnership command. A disabled TPM 1 that has a TPM Owner is not able to execute normal TPM commands.

The flag pFlags.tpmDisabled contains the current enablement status. When set to TRUE the TPM is disabled, when FALSE the TPM is enabled. Changing the setting pFlags.tpmDisabled has no effect on any secrets or other values held by the TPM. No keys, monotonic counters or other resources are invalidated by changing TPM enablement. There is no guarantee that session resources (like transport sessions) survive the change in enablement, but there is no loss of secrets.

The TPM_OwnerSetDisable command can be used to transition in either Enabled or Disabled states. The desired state is a parameter to TPM_OwnerSetDisable. This command requires TPM Owner authentication to operate. It is suitable for post-boot and remote invocation.

An unowned TPM 1 requires the execution of TPM_PhysicalEnable to enable the TPM 1 and TPM_PhysicalDisable to disable the TPM 1. Operators of an owned TPM 1 can also execute these two commands. The use of the physical commands allows a platform operator to disable the TPM 1 without TPM Owner authorization.

TPM_PhysicalEnable transitions the TPM 1 from Disabled to Enabled state. This command is guarded by a requirement of operator physical presence. Additionally, this command can be invoked by a physical event at the platform, whether or not the TPM 1 has an Owner or there is a human physically present. This command is suitable for pre-boot invocation.

TPM_PhysicalDisable transitions the TPM 1 from Enabled to Disabled state. It has the same guard and invocation properties as TPM_PhysicalEnable.

Misuse of the disabled state can result in denial-of-service. Proper management of Owner-authorization-data and physical access to the platform is a critical element in ensuring availability of the system.

A deactivated TPM is not able to execute commands that use TPM resources. A major difference between deactivated and disabled is that a deactivated TPM can execute the TPM_TakeOwnership command.

Activation control is with both persistent and volatile flags. The persistent flag is never directly checked by the TPM 1, rather it is the source of the original setting for the volatile flag. During TPM initialization the value of the flag pFlags.tpmDeactivated is copied to vFlags.tpmDeactivated. When the TPM execution engine checks for TPM activation, it only references the flag vFlags.tpmDeactivated.

Toggling the state of pFlags.tpmDeactivated uses TPM_PhysicalSetDeactivated. This command requires physical presence. There is no associated TPM Owner authenticated command as the TPM Owner can always execute TPM_OwnerSetDisabled which results in the same TPM operations. The toggling of this flag does not affect the current operation of the TPM but requires a reboot of the platform such that the persistent flag is again copied to the volatile flag.

The volatile flag, vFlags.tpmDeactivated, is set during initialization by the value of pFlags.tpmDeactivated. If vFlags.tpmDeactivated is true the only way to reactivate the TPM is to reboot the platform and have pFlags reset the vFlags value.

If vFlags is false and the TPM 1 running TPM_SetTempDeactivated will set vFlags.tpmDeactivated to TRUE and then require a reboot of the platform to reactivate the platform.

The owner of the TPM has ultimate control of the TPM. The owner of the TPM 1 can enable or disable the TPM 1, create AIK and set policies for the TPM 1. The process of taking ownership should be a tightly controlled process with numerous checks and balances.

The protections around the taking of ownership include the enablement status, specific persistent flags and the assertion of physical presence.

Control of the TPM 1 revolves around knowledge of the TPM Owner authentication value. Proving knowledge of authentication value proves the calling entity is the TPM Owner. It is possible for more than one entity to know the TPM Owner authentication value.

The purpose of the authorization protocols and mechanisms is to prove to the TPM 1 that the requestor has permission to perform a function and use some object. The proof comes from the knowledge of a shared secret.

Authorization data is available for the TPM Owner and each entity (keys, for example) that the TPM controls.

The authorization data for the TPM Owner and the SRK are held within the TPM itself and the authorization data for other entities are held with the entity.

At the moment there are three protocols to securely pass a proof of knowledge of authorization data from requestor to TPM 1; the "Object-Independent Authorization Protocol" (OIAP), the "Object-Specific Authorization Protocol" (OSAP) and the "Delegate-Specific Authorization Protocol" (DSAP). The OIAP supports multiple authorization sessions for arbitrary entities. The OSAP supports an authentication session for a single entity and enables the confidential transmission of new authorization information. The DSAP supports the delegation of owner or entity authorization.

The protocols use a "rolling nonce" paradigm. This requires that a nonce from one side be in use only for a message and its reply. For instance, the TPM 1 would create a nonce and send that on a reply. The requestor would receive that nonce and then include it in the next request. The TPM would validate that the correct nonce was in the request and then create a new nonce for the reply. This mechanism is in place to prevent replay attacks and man-in-the-middle attacks.

The basic protocols do not provide long-term protection of authorization data that is the hash of a password or other low-entropy entities. The TPM designer and application writer must supply additional protocols if protection of these types of data is necessary.

The design criterion of the protocols is to allow for ownership authentication, command and parameter authentication and prevent replay and man-in-the-middle attacks.

The passing of the authorization data, nonces and other parameters should follow specific guidelines so that commands coming from different computer architectures will interoperate properly.

Now, the method according to an example embodiment of the present invention will be described. First, the Delegation Agent 4 will be created on the system 3 in the following manner.

The Delegation Agent 4 is delegated the ability to run the TPM_MakeIdentity and TPM_ActivateIdentity commands by the TPM Owner using TPM_CreateOwnerDelegatoin.

The TPM 1 creates a delegation for the storage root key using TPM_CreateKeyDelegation. This may or may not be encrypted using e.g. a user-chosen password or PIN code. This delegation is stored on the device. Alternatively no delegation is made for the storage root key and the storage root key authorization secret is set to a known constant.

The delegations are passed to the Delegation Agent 4. The Delegation Agent 4 creates a storage keypair using TPM_CreateWrapKey and seals the created owner delegation to a trusted platform state using the created key. This key is called as the Agent Key 5.

The created storage keys should be non-migratable.

Now, if an external party 6 (network operator, service provider, . . . ) needs data to be placed on the device 2 in secure storage, it can interact with the delegation agent 4. The Delegation Agent 4 can create for it a keypair encrypted under the Agent Key 5 as per existing TCG specs and protocols.

Now, if an external party 6 (network operator, service provider, . . . ) needs a new attestation identity to be created it can contact the Delegation Agent 4. The Delegation Agent 4 can now (assuming it is running in a trustworthy state) request permission from the user and other necessary stakeholders, before allowing this operation to happen.

The Attestation Identity Key (AIK) is a key independent of the Endorsement Key (EK). The AIK is possibly bound to the properties of a device via encrypting any published certificates with the EK and sending them to the TPM. The AIK is e.g. a 2048-bit RSA key. Generation of an AIK can occur anytime after establishment of the TPM Owner. The TPM can generate a virtually unlimited number of AIK. The TPM Owner controls all aspects of the generation and activation of an AIK. The TPM Owner controls any data associated with the AIK. The AIK credential may contain application specific information. An AIK is a signature key and it signs information generated internally by the TPM. The data would include PCR, other keys and TPM status information. The EK cannot perform signatures for security reasons and cannot perform signatures due to privacy concerns. The AIK provides a mechanism to create and enroll arbitrary identities at runtime.

Figure 1A:
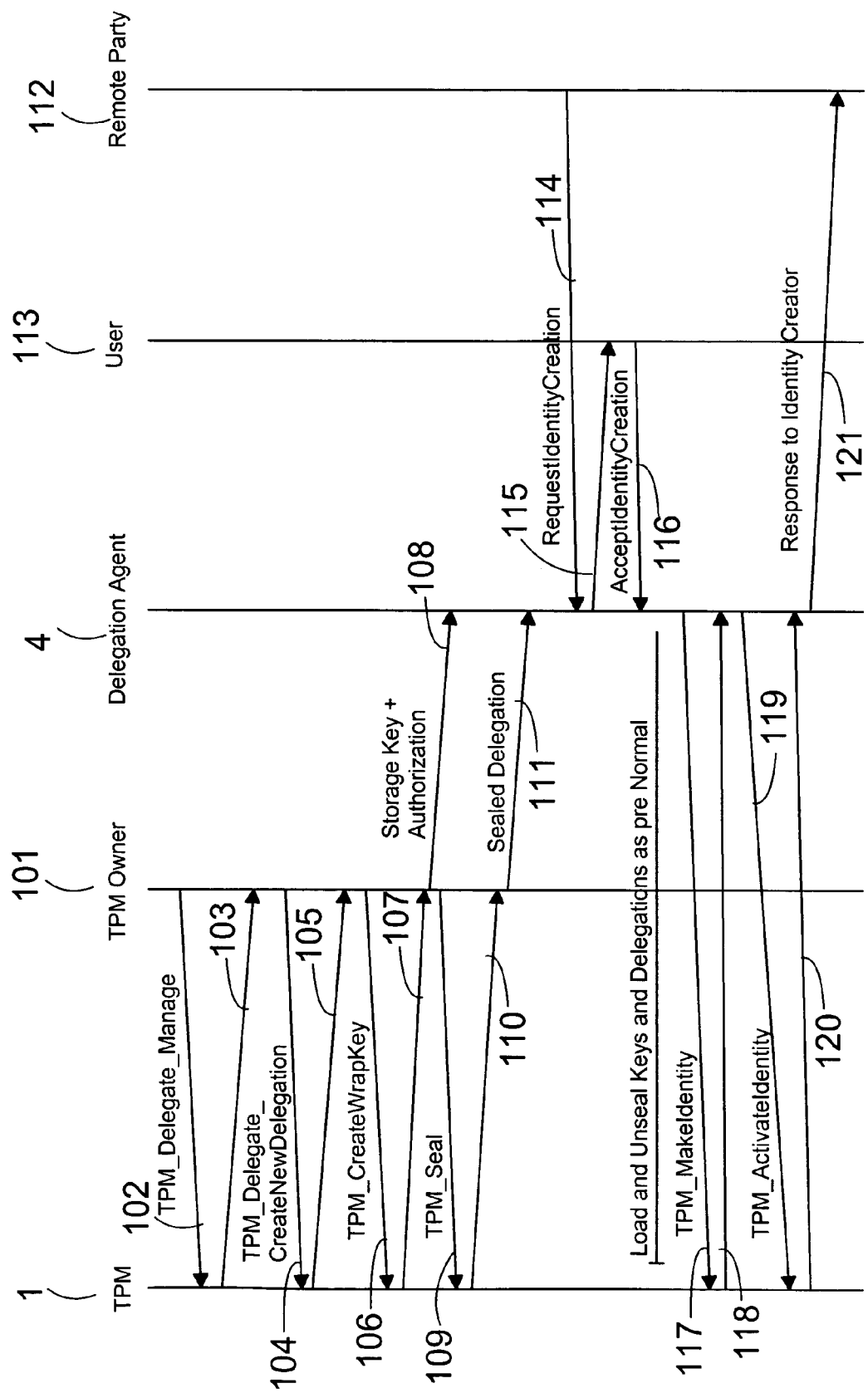
FIG. 1a depicts a high level signalling diagram of the method according to the present invention.

The FIG. 1*a* shows the sequence at a high protocol level roughly in terms of TPM command, authorization protocols used are not shown, but it is assumed that DSAP is used. This sequence assumes that the storage root key is constant and known to all.

First, the TPM Owner 101 sends 102 the delegate manage command (TPM_Delegate_Manage) to the TPM 1. The TPM 1 replies 103 to this command. Thereafter, the TPM Owner 101 sends 104 the creation of owner command (TPM_Delegate_CreateOwnerDelegation) to the TPM 1. The TPM 1 now generates the delegation object and sends 105 a reply to the command. Next, the wrapping key for secure storage is created by sending 106 the command (TPM_CreateWrapKey) to the TPM 1. The TPM 1 generates the storage key and sends 107 it and an authorization to the TPM Owner 102 which forwards 108 them to the delegation agent 4. The TPM Owner 102 requests 109 the TPM 1 to seal the owner delegation. The sealed delegation is sent 110 from the TPM 1 to the TPM Owner 102 which further transmits 111 it to the Delegation Agent 4.

The external party 112 can now request 114 TPM identity creation from the Delegation Agent 4 which may prompt 115 the user 113 before accepting the request. If the user accepted 116 the request the TPM identity is created by sending 117 the TPM_Make_Identity command by the Delegation Agent 4 to the TPM 1. When the TPM 1 has created the identity and informed 118 the Delegation Agent about it the TPM identity can be activated by sending 119 the activation command by the Delegation Agent 4 to the TPM 1. When the TPM 1 has responded 120 to the command the Delegation Agent 4 can inform 121 the remote party 109 about the TPM identity creation. The figure does not explicitly show that the Delegation Agent 4 is sending the public parameters of the generated identity to a remote party for certification and based on that reply calls the TPM_ActivateIdentity command.

Figure 1B:
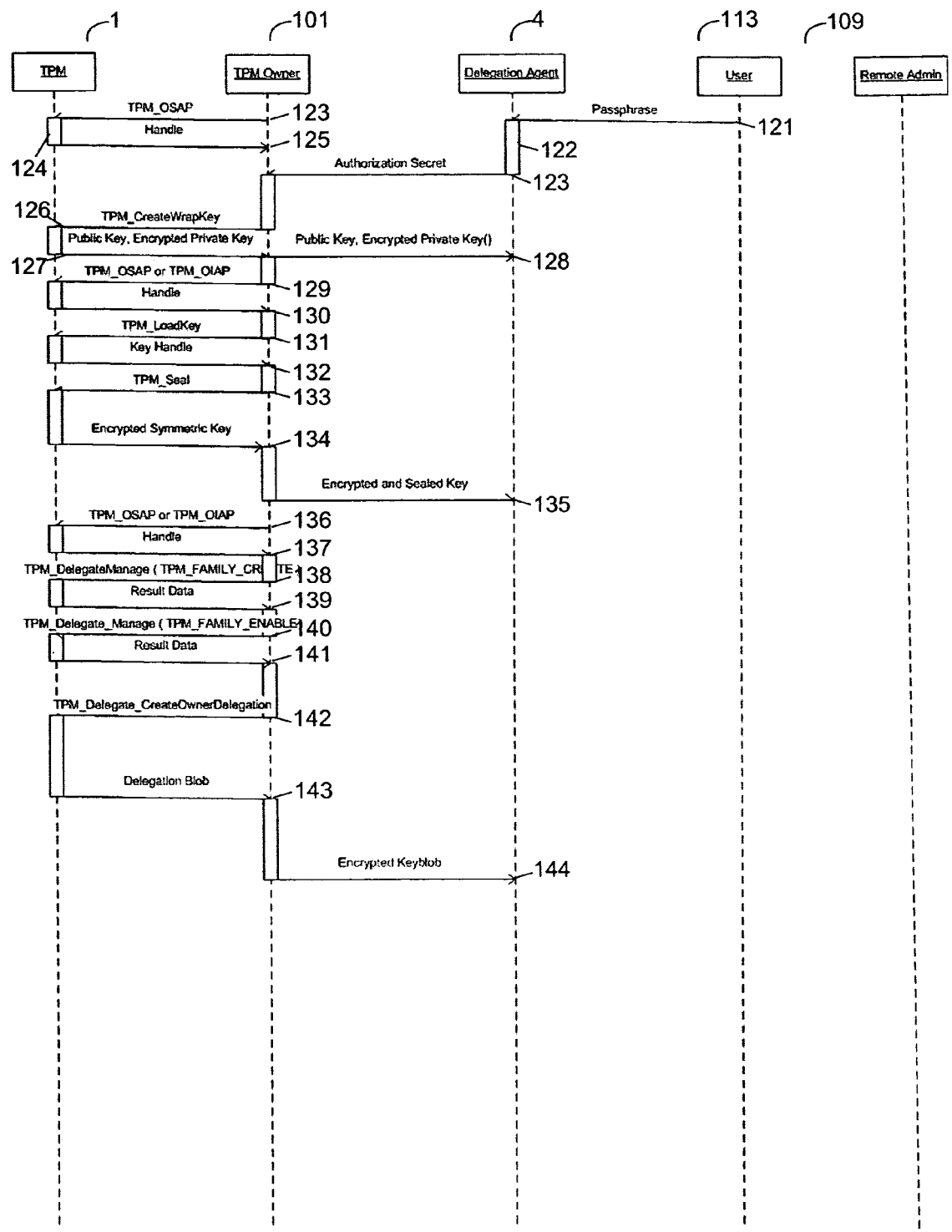
FIG. 1b depicts a more detailed signalling diagram of the method according to the present invention.

In the following, a more detailed description of a method according to an example embodiment of the present will be described with reference to FIG. 1*b*. It is assumed that TPM OSAP and/or TPM OIAP protocols are used but the invention is not limited to those protocols only.

At first the user 113 provides 121 a passphrase to the delegation agent 4. The delegation agent 4 may or may not use this passphrase to create 122 an authorization secret. The TPM Owner 101 creates a session by sending 123 a create session command using e.g. TPM_OSAP to the TPM 1. In the command using the TPM Owner Secret is used. When the TPM 1 has created 124 a session the TPM 1 informs the TPM Owner 101 by sending 125 a message to the TPM Owner 101. In the message a handle to the session is included. The TPM Owner 101 can then use this handle to indicate TPM 1 with which session the TPM Owner wants to communicate.

When the TPM Owner 101 has received the authorization secret from the delegation agent 4, it sends 126 the create wrap key command (TPM_CreateWrapKey) to the TPM 1. The create wrap key command is used together with the TPM_OSAP to create a storage key. The TPM 1 replies to the command by sending 127 a public key and an encrypted private key. The authorization of the storage key is set 128 to the authorization secret provided by the Delegation Agent 4.

Another session is established between the TPM Owner 101 and TPM 1. The TPM Owner 101 sends 129 a command to the TPM 1 using either TPM_OSAP or TPM_OIAP. The TPM 1 creates another session and returns 130 a handle to that session to the TPM Owner 101. The TPM Owner 101 sends 131 the storage key created in the initialization phase to the TPM 1. The TPM 1 stores the storage key and replies by sending 132 a key handle to the TPM Owner 101. The TPM Owner 101 initiates a sealing process by creating a symmetric encryption key and sending 133 a sealing command (TPM_Seal) to the TPM 1. The encryption key is transmitted with the command to the TPM 1. In the TPM 1 the encryption key is sealed to a trustworthy platform state using the created storage key. The encrypted symmetric key is transmitted 134 to the TPM Owner 101, which forwards 135 the encrypted symmetric key to the Delegation Agent 4.

Another session is again established, if necessary, between the TPM 1 and the TPM Owner 101. This is indicated by the arrows 136 and 137 in the FIG. 1*b*.

Next, the creation of a delegation family for the delegation agent 4 is described. The Delegate Manager of the TPM 1 is used to create and enable the delegation family. The TPM Owner 101 sends 138 the delegation manage command (TPM_DelegateManage) to the TPM 1. The command includes a delegation family creation parameter (TPM_Family_Create) to inform the Delegate Manager about the need for creating a new delegation family for the Delegation Agent 4. The TPM 1 returns 139 the result of the creation process. If the creation was successful, the delegation family can be activated by sending 140 a delegation manage command including a delegation family enable parameter (TPM_Family_Enable). The TPM 1 returns 141 the result of the enablement process.

The Attestation Identity Key can be created by using the make identity command (TPM_MakeIdentity) and activated by using the activate identity command (TPM_ActivateIdentity). A delegation blob for the TPM_MakeIdentity and TPM_ActivateIdentity commands can be created by sending 142 the create owner delegation command (TPM_Delegate_CreateOwnerDelegation) from the TPM Owner 101 to the Delegate Manager of the TPM 1. The Delegate Manager creates the delegation blob and sends 143 it to the TPM Owner 101. This delegation blob is encrypted by the TPM Owner 101 using the created symmetric key. The encrypted delegation blob, the created storage keypair and the sealed symmetric key are given 144 to the delegation agent 4.

Figure 1C:
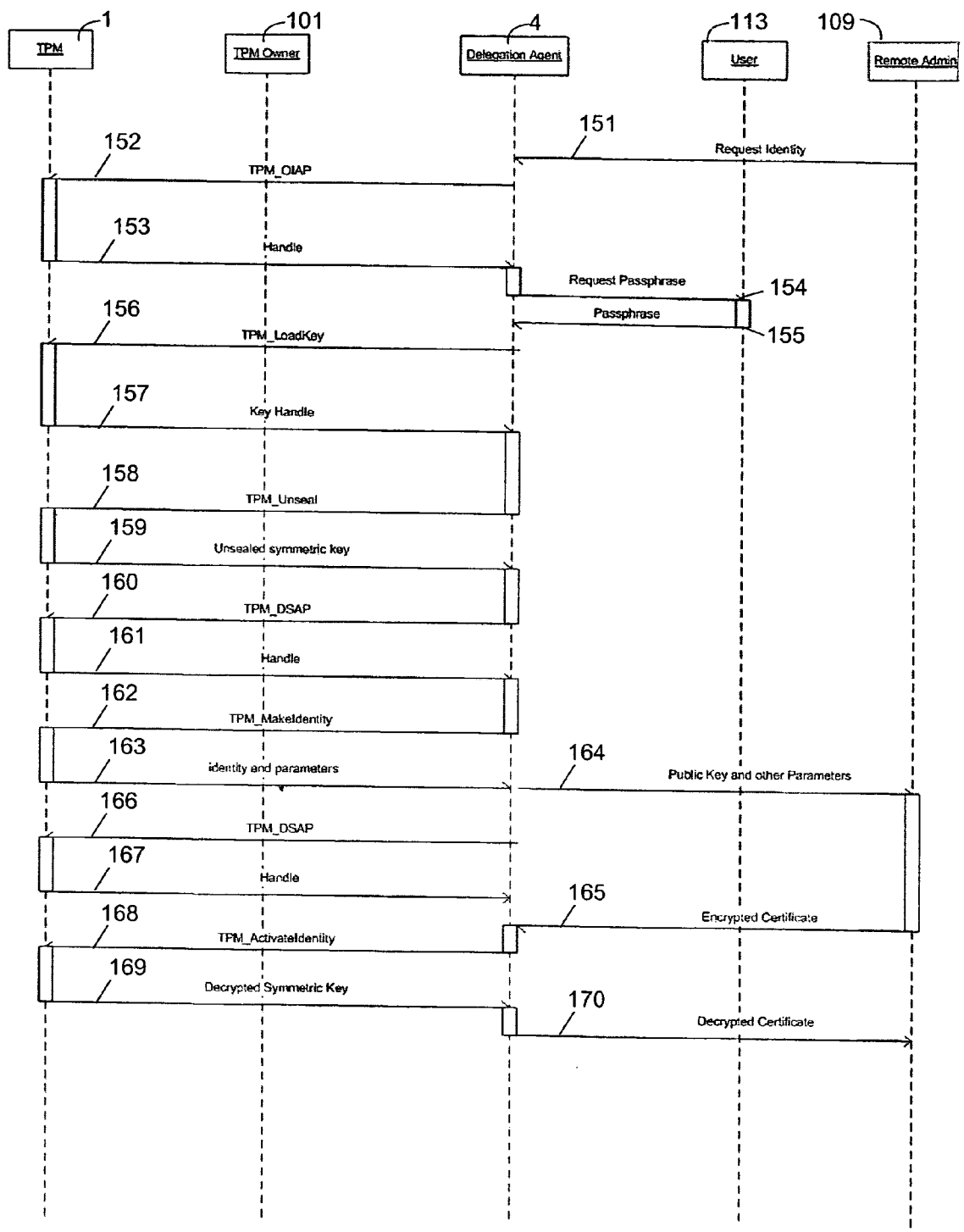
FIG. 1c depicts a creation of an identity.

Next, the creation of the identity is described with reference to the FIG. 1c. A remote admin 109 requests 151 the delegation agent 4 to create a new identity i.e. a public-cryptography keypair and a certificate for the public key. The delegation agent 4 then creates (arrows 152, 153) a session with the TPM 1 using TPM_OIAP or TPM_OSAP for example in the similar way than was disclosed above. The user 113 is asked 154 for approval if the identity is to be created. The user 113 enters 155 the passphrase which is examined by the delegation agent 4 to confirm that the user 113 is authorized to use the service. The storage key created in the initialization phase is loaded 156 into the TPM 1. The TPM 1 stores the storage key and replies by sending 157 a key handle to the TPM Owner 101. The TPM Owner 101 initiates an unsealing process to decrypt the sealed symmetric key by sending 158 an unseal command (TPM_Unseal) to the TPM 1. The unsealed symmetric key is sent 159 from the TPM 1 to the TPM Owner 101. The delegation blob is decrypted using the unsealed symmetric key. TPM_DSAP protocol can then be used to establish a session with the TPM 1 (arrows 160, 161). Then, the TPM_MakeIdentity is used to create a keypair inside the TPM 1 and get a public key (arrows 162, 163).

The public key and other relevant parameters are sent 164 by the Delegation Agent 4 to a remote admin 109, 109'. This may or may not be the same party requesting the identity to be created. This could be a Certificate Authority among other things. The remote admin 109, 109' responds 165 with an encrypted certificate encrypted to the Delegation Agent.

The delegation agent creates a new session with the TPM using TPM_DSAP (arrows 166, 167). The Delegation Agent 4 passes 168 this encrypted certificate to the TPM 1 using TPM_ActivateIdentity command. The TPM 1 sends back 169 the decrypted certificate which the Delegation Agent 4 sends back 170 to the original remote admin 109 that requested the identity to be created.

Figure 3:
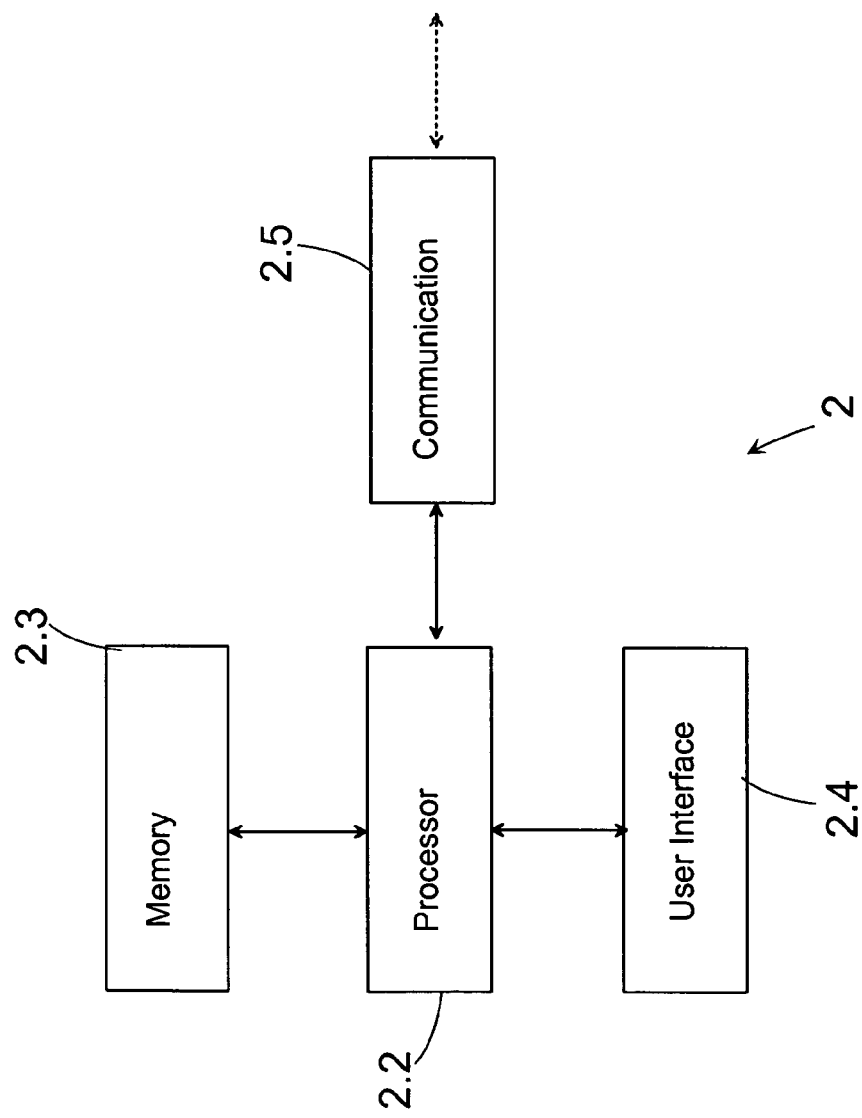
FIG. 3 depicts a device according to an example embodiment of the present invention.

In FIG. 3 there is disclosed a simplified device 2 according to the present invention. The device 2 comprises a processor 2.2 in which the method can be at least partly implemented. There is also memory 2.3 and user interface 2.4 in the device 2. The device 2 can also comprise communication means 2.5 for communicating with other devices, communication networks etc.

Figure 4:
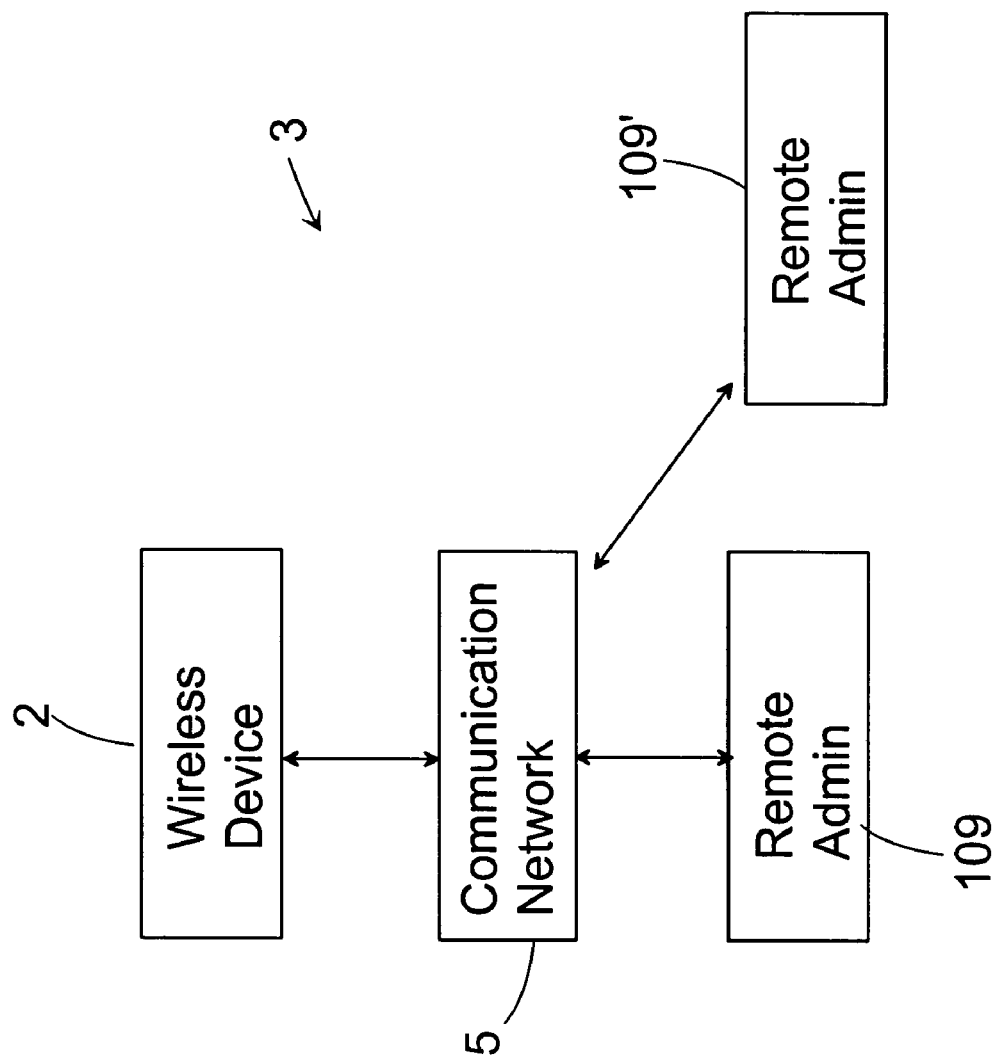
FIG. 4 depicts a system according to an example embodiment of the present invention.

In FIG. 4 there is disclosed a system according to an example embodiment of the present invention in a simplified manner. The device 2 can be, for example, a wireless terminal, a portable computer etc. The device 2 can communicate with a communication network 5 which is, for example, a mobile communication network (GSM, UMTS, WLAN, etc.), internet, or a short range wireless communication network. The remote admin 109, 109' can be, for example, a server of an operator or a mobile communication network, a Certificate Authority etc.

The invention can be implemented as a computer program product (software) which can be stored on a storage medium and run by one or more processors, such as the cryptographic co-processor 1.3 and/or the processor 2.2.

I claim:

1. A method for managing identities in a device comprising a trusted platform module, the method comprising
   using an identity related command for performing identity related action;
   creating a delegation agent;
   creating a storage key for secure storage;
   creating a delegation for the identity related command;
   sealing said delegation using the created storage key to a trustworthy system state;
   delivering the sealed delegation to the delegation agent, and
   performing the above actions on the same trusted platform module.

2. The method according to claim 1, comprising using a trusted platform module owner for the management, wherein said storage key and said delegation are generated by the trusted platform module owner.

3. The method according to claim 1, comprising using a make identity command as said identity related command for making the identity.

4. The method according to claim 1, comprising using an activate identity command as said identity related command for activating the identity.

5. The method according to claim 1, said creation of delegation agent comprising
   sending a delegate manage command from a trusted platform module owner to the trusted platform module,
   sending a reply from the trusted platform module to the trusted platform module owner,
   sending a creation of owner command from the trusted platform module owner to the trusted platform module,
   creating the delegation agent in the trusted platform module, and
   sending a reply from the trusted platform module to the trusted platform module owner.

6. A device comprising a trusted platform module comprising:
   a first component of the device configured to use an identity related command for performing identity related action;
   a second component of the device configured to create a delegation agent;
   a third component of the device configured to create a storage key for secure storage;
   a fourth component of the device configured to create a delegation for the identity related command;
   a fifth component of the device configured to seal said delegation using the created storage key to a trustworthy system state; and
   a sixth component of the device configured to deliver the sealed delegation to the delegation agent.

7. The method according to claim 1, comprising
   revoking a delegation by the trusted platform module owner;
   determining other delegations which belong to a same family of delegations than said delegation to be revoked; and
   revoking also the other delegations which belong to the same family than said delegation to be revoked.

8. The device comprising the trusted platform module according to claim 6, an input/output component for communicating with a trusted platform module owner, wherein said storage key and said delegation are received from the trusted platform owner.

9. The device comprising the trusted platform module according to claim 6, wherein said identity related command is a make identity command for making the identity.

10. The device comprising the trusted platform module according to claim 6, wherein said identity related command is an activate identity command for activating the identity.

11. The device comprising the trusted platform module according to claim 6 comprising an execution engine, wherein said first component, second component, third component, fourth component and fifth component are implemented in said execution engine.

12. The device comprising the trusted platform module according to claim 8, wherein said sixth component is implemented in said input/output component.

13. An electronic device comprising a trusted platform module comprising
a storage;
a first component for using an identity related command for performing identity related action;
a second component for creating a delegation agent;
a third component for creating a storage key for secure storage;
a fourth component for creating a delegation for the identity related command;
a fifth component for sealing said delegation using the created storage key to a trustworthy system state; and
a sixth component for delivering the sealed delegation to the delegation agent.

14. The electronic device according to claim 13 comprising a trusted platform module owner.

15. The electronic device according to claim 14, wherein said trusted platform module owner comprises
a seventh component for generating a symmetric encryption key; and
an eighth component for initiating the creation of said delegation;
wherein said storage key and said delegation are transmitted from the trusted platform module owner to the trusted platform module.

16. The electronic device according to claim 13, wherein it is a wireless communication device.

17. A system comprising
an electronic device;
a communication network; and
a remote device;
wherein the electronic device comprises a trusted platform module comprising
a storage;
a first component for using an identity related command for performing identity related action;
a second component for creating a delegation agent;
a third component for creating a storage key for secure storage;
a fourth component for creating a delegation for the identity related command;
a fifth component for sealing said delegation using the created storage key to a trustworthy system state; and
a sixth component for delivering the sealed delegation to the delegation agent.

18. A computer program product carrying program code for managing identities in a device comprising a trusted platform module, the program code comprising instructions for
using an identity related command for performing identity related action;
creating a delegation agent;
creating a storage key for secure storage;
creating a delegation for the identity related command;
sealing said delegation using the created storage key to a trustworthy system state; and
delivering the sealed delegation to the delegation agent.

19. A trusted platform module comprising
means for using an identity related command for performing identity related action;
means for creating a delegation agent;
means for creating a storage key for secure storage;
means for creating a delegation for the identity related command;
means for sealing said delegation using the created storage key to a trustworthy system state; and
means for delivering the sealed delegation to the delegation agent.

* * * * *

UNITED STATES PATENT AND TRADEMARK OFFICE
CERTIFICATE OF CORRECTION

PATENT NO. : 7,640,593 B2  Page 1 of 1
APPLICATION NO. : 11/112725
DATED : December 29, 2009
INVENTOR(S) : Lauri Tarkkala It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1282 days.

Signed and Sealed this

Twenty-first Day of December, 2010

David J. Kappos
*Director of the United States Patent and Trademark Office*